United States Patent [19]

Anner et al.

[11] 3,929,844

[45] Dec. 30, 1975

[54] 3-CYCLOPENTYL ETHERS OF 7α-METHYL ESTRONE

[75] Inventors: Georg Anner; Jaroslav Kalvoda, both of Basel, Switzerland

[73] Assignee: Ciba-Geigy Corporation, Ardsley, N.Y.

[22] Filed: Aug. 31, 1973

[21] Appl. No.: 393,518

Related U.S. Application Data

[63] Continuation of Ser. No. 136,161, April 21, 1971, abandoned.

[30] Foreign Application Priority Data

Apr. 24, 1970 Switzerland.......................... 6217/70

[52] U.S. Cl............................... 260/397.4; 424/243
[51] Int. Cl.$^2$............................................. C07J 1/00
[58] Field of Search ....................................
/Machine Searched Steroids; 260/397.4

[56] References Cited
UNITED STATES PATENTS

| | | | |
|---|---|---|---|
| 3,159,543 | 12/1964 | Ercoli .............................. | 260/397.5 |
| 3,326,945 | 6/1967 | Chamberlin .................... | 260/397.4 |
| 3,366,652 | 1/1968 | Wendt et al. ................... | 260/397.4 |
| 3,472,881 | 10/1969 | Kuo et al. ........................ | 260/397.1 |
| 3,520,882 | 7/1970 | Cross et al. ..................... | 260/239.55 |
| 3,804,866 | 4/1974 | Anner et al. .................... | 260/397.5 |
| 3,840,568 | 10/1974 | Gardi et al. ..................... | 260/397.5 |

FOREIGN PATENTS OR APPLICATIONS

| | | | |
|---|---|---|---|
| 1,434,174 | 12/1964 | France ............................. | 260/397.5 |

OTHER PUBLICATIONS

Ercoli et al., Endrocrinology, Vol. 71, pp. 593–597, (1962).

*Primary Examiner*—Elbert L. Roberts
*Attorney, Agent, or Firm*—Joseph G. Kolodny; John J. Maitner; Theodore O. Groeger

[57] ABSTRACT

3-cyclopentyl-ether of 7 -methyl estrone and derivatives thereof.

1 Claim, No Drawings

3-CYCLOPENTYL ETHERS OF 7α-METHYL ESTRONE

CROSS-REFERENCE TO RELATED APPLICATION

This application is a continuation of Ser. No. 136,161, filed Apr. 21, 1971, now abandoned.

The subject of the present invention is the 3-cyclopentyl-ether of 7α-methyloestrone of formula

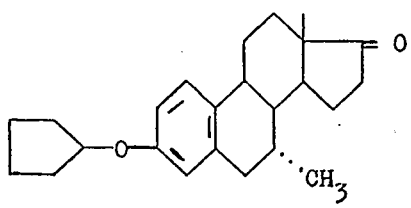

and a process for its manufacture.

This compound possesses valuable pharmacological properties. Thus it above all exerts an oestrogenic, uterotropic and/or blastocyte-implantation-inhibiting effect. It for example displays an oestrogenic effect on single oral administration in the vaginal keratinisation test on female rats at doses of 0.1 to 10 mg/kg. The uterotropic activity can be demonstrated on female rats already after a single peroral administration of doses of 0.3 to 10 mg/kg. The blastocyte-implantation-inhibiting property can be demonstrated on normal rats after copulation by means of a single perorally administered dose of 0.03 to 0.3 mg/kg, and the disturbance of the vaginal and ovulatory cycles of female rats can be overcome by means of a single peroral administration of 1 mg/kg. The new compound can hence be used as an oestrogenic agent and for the control of fertility.

The new compound can be obtained according to methods which are in themselves known, if, for example, a compound of general formula

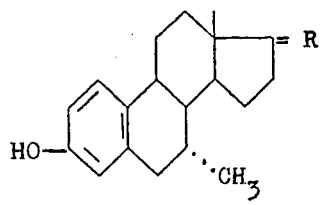

wherein R represents a free or ketalised oxo group, such as a lower alkylenedioxy group, for example the ethylenedioxy or propylenedioxy group, or a free or esterified hydroxyl group, is etherified in the 3-position by means of cyclopentanol and the radical R is optionally converted into a free oxo group.

An esterified hydroxyl group is, for example, a hydroxyl group esterified with an organic carboxylic acid, such as with an aliphatic, cycloaliphatic, aromatic, araliphatic or heterocyclic carboxylic acid, primarily an acid of this kind with at most 20 carbon atoms, especially a lower aliphatic carboxylic acid, for example formic, acetic, propionic or butyric acid, or a benzoic acid which is optionally substituted by lower alkyl, such as methyl, or lower alkoxy, such as methoxy, groups, or a carbonic acid which is esterified with a lower aliphatic radical, such as methylcarbonic or ethylcarbonic acid. The etherification is in most cases carried out by reacting a compound of formula II or a salt thereof, for example the sodium or potassium salt, with a reactive ester of cyclopentanol, optionally in the presence of a basic catalyst, such as sodium or potassium carbonate, hydroxide or alcoholate, for example methanolate or ethanolate. As reactive esters, those with strong inorganic or organic acids, such as hydrogen halide acids, especially hydrochloric or hydrobromic acid, sulphuric acid or an organic sulphonic acid, such as methanesulphonic or ethanesulphonic acid or an optionally substituted benzenesulphonic acid, primarily benzenesulphonic acid itself, p-chlorobenzenesulphonic acid or p-toluenesulphonic acid, are preferably used.

The conversion of the radical in the 17-position into the oxo group takes place in a manner which is in itself known. Thus it is possible to hydrolyse a ketalised oxo group or an esterified hydroxyl group and to oxidise the resulting free hydroxyl group to the oxo group. The hydrolysis of the ketalised oxo group preferably takes place in an acid medium, whilst the esterified hydroxyl group is primarily split by means of bases or hydrogenolytically, for example with lithium aluminium hydride. Suitable oxidising agents by converting a free hydroxyl group into the oxo group are, as is known, for example chromic acid, or the method according to Oppenauer is used, employing an aluminium alcoholate in the presence of a ketone, for example in toluene solution. The reactions mentioned can be carried out in a customary solvent.

The new compound can be used as a medicine in the form of pharmaceutical preparations which contain this compound together with pharmaceutical, organic or inorganic, solid or liquid excipients which are suitable for enteral, especially oral, or parenteral administration. Possible substances for forming the excipients are those which do not react with the new compound, such as for example water, gelatine, lactose, starch, magnesium stearate, talc, vegetable oils, benzyl alcohols, gum, polyalkylene glycols, cholesterol or other known medicinal excipients. The pharmaceutical preparations can for example be in the form of tablets, dragees or capsules or in a liquid form as solutions, suspensions or emulsions. They are optionally sterilised and/or contain auxiliary substances, such as preservatives, stabilisers, wetting agents or emulsifiers, salts for regulating the osmotic pressure or buffers. They can also contain yet further therapeutically valuable substances. The pharmaceutical preparations are formulated in accordance with the customary methods.

The new compound can also be used in veterinary medicine, for example in one of the abovementioned forms, or in the form of feedstuffs or of additives for animal fodder. Herein the usual extenders and variants or feedstuffs are for example used.

The invention also relates to those embodiments of the process in which a starting product is formed under the reaction conditions or in which one starts from an intermediate product obtainable at any stage of the process and carries out the missing stages or stops the process at any stage, as well as the new intermediate products.

The Examples which follow illustrate the invention without however restricting it in any respect.

EXAMPLE 1

5.0 g of 7α-methyl-oestrone are added to a sodium alcoholate solution manufactured by dissolving 0.60 g of sodium in 40 ml of ethanol. The mixture is thereafter briefly warmed to about 60°C, then cooled, mixed with 4.4 ml of cyclopentyl bromide and subsequently boiled for 18 hours under reflux. The suspension is concentrated in a waterpump vacuum, mixed with 50 ml of water, and the mixture extracted three times with methylene chloride. The extracts are washed with water until neutral, dried and evaporated in a waterpump vacuum. The pure 3-cyclopentyloxy-7α-methyl-17-oxo-$\Delta^{1,3,5(10)}$-oestratriene is obtained by chromatography of the resulting residue on silica gel. The compound recrystallised from methylene chloride/methanol melts at 136°–137°C. $\alpha_D = +128°C$ (from chloroform).

EXAMPLE 2

A solution of 1.50 g of 3,17β-dihydroxy-7α-methyl-$\Delta^{1,3,5(10)}$-oestratriene in 50 ml of methyl alcohol is successively mixed with 1.0 g of potassium carbonate and 1.5 g of cyclopentyl bromide and boiled for 24 hours under reflux. The reaction mixture is concentrated in a waterpump vacuum and mixed with water, the mixture is extracted with an ether-methylene chloride(5:1) mixture, and the organic solution is washed with water, dried and evaporated in a waterpump vacuum. Chromatography of the resulting crude product on silica gel yields the pure 3-cyclopentyloxy-7α-methyl-17β-hydroxy-$\Delta^{1,3,5(10)}$-oestratriene of melting point 67°–70°C.

706 mg of this compound are dissolved in 10 ml of acetone, cooled to 0°C, mixed with 0.5 ml of an 8 N solution of chromium(VI) oxide in dilute sulphuric acid, the mixture stirred for 5 minutes at about 3°C and mixed with 5 g of sodium acetate and water, and this mixture extracted three times with an ether-methylene chloride(5:1) mixture. The organic solutions are washed with water, dried and evaporated in a waterpump vacuum. The resulting 3-cyclopentyloxy-7α-methyl-17-oxo-$\Delta^{1,3,5(10)}$-oestratriene melts at 135°–137°C after recrystallisation from methylene chloride-methanol.

What we claim is:

1. The 3-cyclopentyl ether of 7α-methyloestrone of the formula

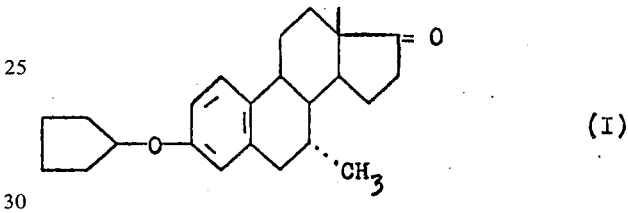

(I)